(12) United States Patent
Nease, III (10) Patent No.: US 8,613,350 B2
(45) Date of Patent: Dec. 24, 2013

(54) INFINITELY VARIABLE WRENCH

(76) Inventor: Hiram Lee Nease, III, Shelbyville, TN (US)

( * ) Notice: Subject to any disclaimer, the term of this patent is extended or adjusted under 35 U.S.C. 154(b) by 390 days.

(21) Appl. No.: 12/982,383

(22) Filed: Dec. 30, 2010

(65) Prior Publication Data

US 2011/0155531 A1    Jun. 30, 2011

Related U.S. Application Data

(60) Provisional application No. 61/291,456, filed on Dec. 31, 2009.

(51) Int. Cl.
*F16D 41/08*  (2006.01)
*B25B 13/46*  (2006.01)

(52) U.S. Cl.
USPC ................................. 192/44; 192/47; 81/63.1

(58) Field of Classification Search
USPC ......................... 192/38, 44, 47; 81/59.1, 63.1
See application file for complete search history.

(56) References Cited

U.S. PATENT DOCUMENTS

| | | | |
|---|---|---|---|
| 3,204,496 A | 9/1965 | Ingram | |
| 3,476,226 A * | 11/1969 | Massey | ............ 192/44 |
| 3,621,739 A | 11/1971 | Seablom | |
| 3,823,625 A | 7/1974 | Myers | |
| 4,457,416 A | 7/1984 | Kutzler | |
| 4,669,338 A | 6/1987 | Collins | |
| 4,669,339 A | 6/1987 | Cartwright | |
| 4,674,368 A | 6/1987 | Surowiecki | |
| 4,870,817 A | 10/1989 | Conn | |
| 4,873,898 A | 10/1989 | Chern | |
| 4,887,703 A | 12/1989 | Moore et al. | |
| 5,086,673 A | 2/1992 | Korty | |
| 5,115,699 A | 5/1992 | Mertens | |
| 5,136,901 A | 8/1992 | Williams | |
| 5,145,042 A | 9/1992 | MacPherson | |
| 5,152,197 A | 10/1992 | Szymber et al. | |
| 5,351,583 A | 10/1994 | Szymber et al. | |
| 5,404,773 A | 4/1995 | Norville | |
| 5,417,129 A | 5/1995 | Baron | |
| 5,697,267 A | 12/1997 | Tsai | |
| 6,055,888 A | 5/2000 | Mitchell | |
| 6,237,447 B1 | 5/2001 | Chen et al. | |
| 6,267,027 B1 | 7/2001 | Mitchell | |
| 6,367,354 B1 | 4/2002 | Mitchell | |
| 6,993,997 B1 | 2/2006 | Marro | |
| 7,201,262 B2 * | 4/2007 | Hamasaki et al. | ............ 192/38 |
| 7,464,801 B2 * | 12/2008 | Wittkopp | ............ 192/44 |
| 2007/0137440 A1 * | 6/2007 | Hwang | ............ 81/59.1 |

\* cited by examiner

*Primary Examiner* — David D Le
*Assistant Examiner* — Jacob S Scott
(74) *Attorney, Agent, or Firm* — Knox Patents; Thomas A. Kulaga (57) ABSTRACT

Apparatus for an anti-rotation mechanism, such as used in a wrench. The space between a pair of races contains a plurality of pairs of rollers. One race has a protrusion centered inside each pair of rollers, with the rollers biased against the protrusion. Adjacent the protrusion and between the rollers of each pair is a prong that selectively biases one or the other of the rollers of the pair away from the protrusion. When one roller in the pair of rollers is biased away from the corresponding protrusion, relative motion between the pair of races is enabled in only one direction. The protrusions extend into the space between the pair of races sufficiently to prevent the rollers from moving under load when relative motion is inhibited.

17 Claims, 4 Drawing Sheets

INFINITELY VARIABLE WRENCH

CROSS-REFERENCE TO RELATED APPLICATIONS

This application claims the benefit of U.S. Provisional Application No. 61/291,456, filed Dec. 31, 2009.

STATEMENT REGARDING FEDERALLY SPONSORED RESEARCH OR DEVELOPMENT

Not Applicable

BACKGROUND OF THE INVENTION

1. Field of Invention

This invention pertains to an anti-rotation mechanism that has infinitely variable steps for a ratchet-like operation, for example, a socket wrench.

2. Description of the Related Art

A wrench is a tool used to grip and provide mechanical advantage in applying torque to a fastener. A common type of wrench is a ratchet wrench, which allows rotary motion in one direction while inhibiting motion in the opposite direction. A ratchet wrench uses a gear and a pawl to control the rotary motion. The teeth of the gear define the minimum angular rotation of the wrench when in operation.

Other types of wrenches besides those using ratchets are known. For example, U.S. Pat. No. 6,055,888 discloses a wrench device with a bearing-type clutch for selectively and reversibly providing a unidirectional rotational force and an opposite unidirectional independent rotation. The wrench device includes one or more bearings disposed in an irregular space between a primary wall of a primary body and a secondary wall of a secondary body. The space has tapering or narrowing sections in which the bearings bind to fixedly engage the primary and secondary bodies as the primary body rotates in a first rotational direction. A pin or toggle dislodges a bearing so that the primary body may rotate freely in a second, opposing rotational direction while another bearing binds the secondary body to the primary body when said primary body is rotated in the first rotational direction. Alternatively, a bearing is selectively positioned in the space to cause the primary and secondary to rotate together or independently depending on the positioning of the bearing and the rotational direction of the primary body.

U.S. Pat. No. 6,367,354 was filed as a continuation-in-part application of U.S. Pat. No. 6,055,888. U.S. Pat. No. 6,367,354 identifies a problem with bearing-type wrenches, which is that they may roll under high torque conditions. The roller bearings of wrenches of the type disclosed in U.S. Pat. No. 6,055,888 inhibit rotation at the expense of applying an outward force to the wrench housing. Under high toque conditions, the outward force is sometimes sufficient to deform the wrench housing sufficiently to allow the bearing to move or slip.

BRIEF SUMMARY OF THE INVENTION

According to one embodiment of the present invention, an anti-rotation mechanism that selectively inhibits rotation in either or both directions is provided. The anti-rotation mechanism has a reversible, bearing-type clutch. The anti-rotation mechanism operates silently, having substantially an infinite number of engagement points such that any rotational movement of the anti-rotation mechanism instantaneously engages the driver. The anti-rotation mechanism includes a direction switching mechanism that includes a clockwise, counter-clockwise, and locked position.

The anti-rotation mechanism has a pair of coaxial races with one race having a convoluted configuration with protrusions that define a gap between the protrusion and the other race. The gap is smaller than the diameter of a plurality of rollers between the pair of races. The rollers each have a line of contact that engages a side of the protrusion and inhibits relative rotation between the two races. The line of contact is located medially in the quadrant of the roller that has one side on the line defined by the centers of the roller and the races. In this way, the developed forces have a vector that avoids deforming the outer race, which would allow the inner race to move relative to the outer race.

The rollers are biased toward the protrusions. Between the rollers of each pair of rollers is a prong that moves between multiple positions. In an embodiment with a center position, the prongs do not contact the rollers and the rollers are biased against a corresponding protrusion, thereby preventing any movement of the inner race relative to the outer race. With the prongs in other positions, each prong biases one of the pair of rollers away from the corresponding protrusion, thereby enabling relative motion in one direction or the other.

The prongs are attached to a control plate that, in one embodiment, has a thumb operated tab that moves the control plate, and the prongs, to various positions. In one embodiment, the anti-rotation mechanism is incorporated in a wrench, for example, a socket wrench. Such a wrench is not bound by the angular separation of the teeth of a typical ratchet wrench. Such a wrench allows the handle to move as much or as little as possible or desired with a reciprocating motion.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Apparatus for an anti-rotation mechanism 400 is disclosed. Such a mechanism 400 is suitable for use in a wrench 100 or other device in which the direction of rotation is desired to be selectable and motion in the other direction is desired to be inhibited.

Figure 1:
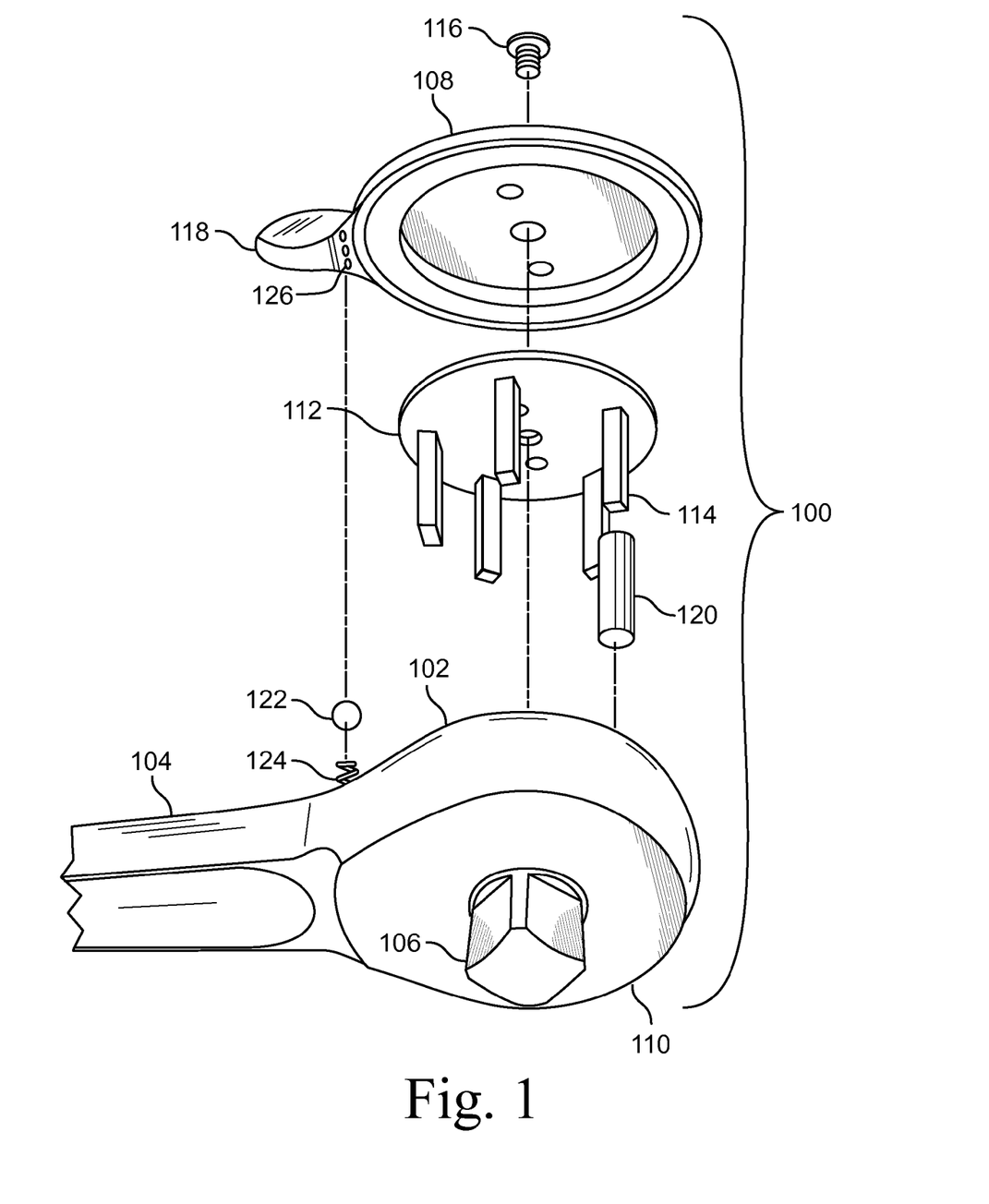
FIG. 1 is an exploded perspective view of one embodiment of a wrench.

FIG. 1 illustrates an exploded perspective view of one embodiment of a wrench 100. The head 110 of the wrench 100 has a handle 104 extending from the head 110, which is a housing 102 for the anti-rotation mechanism 400. A drive end 106 extends from the head 110. The illustrated embodiment has a drive end 106 that is a square drive, such as is common with socket wrenches, also commonly known as ratchets.

A control plate 112 with extending prongs 114 fits into the housing 102, along with a plurality of rollers 120. The rollers 120 are cylinders with squared ends.

In the illustrated embodiment, the control plate 112 cooperates with a recess in a cover 108, which fits over the opening in the housing 102. The cover 108 attaches to the control plate 112 with a fastener 116 that engages a threaded opening in the control plate 112. In one embodiment, pins rotationally lock the control plate 112 to the cover 108. The cover 108 has a lever, or thumb tab, 118 that is suitable to be operated by an operator's thumb. In various embodiments the cover 108 is secured to the head 110 with a retainer ring, a snap ring, or other attachment mechanism that holds the cover 108 captive while allowing the cover 108 to rotate the control plate 112 inside the housing 102.

The illustrated cover 108 is movable to three positions where the cover 108 is releasably secured. A spring-loaded detent includes a ball 122 and spring 124 received in a cavity 206 in the head 110. The ball 122 engages one of three recesses 126 corresponding to the positions of the cover 108. The center position inhibits relative motion in either direction. The positions on either side of the center position inhibit relative motion in one direction or the other. In another embodiment, the ball 122 engages one of two recesses 126 corresponding to two positions of the cover 108 and selectively inhibiting relative motion in two directions.

Figure 2:
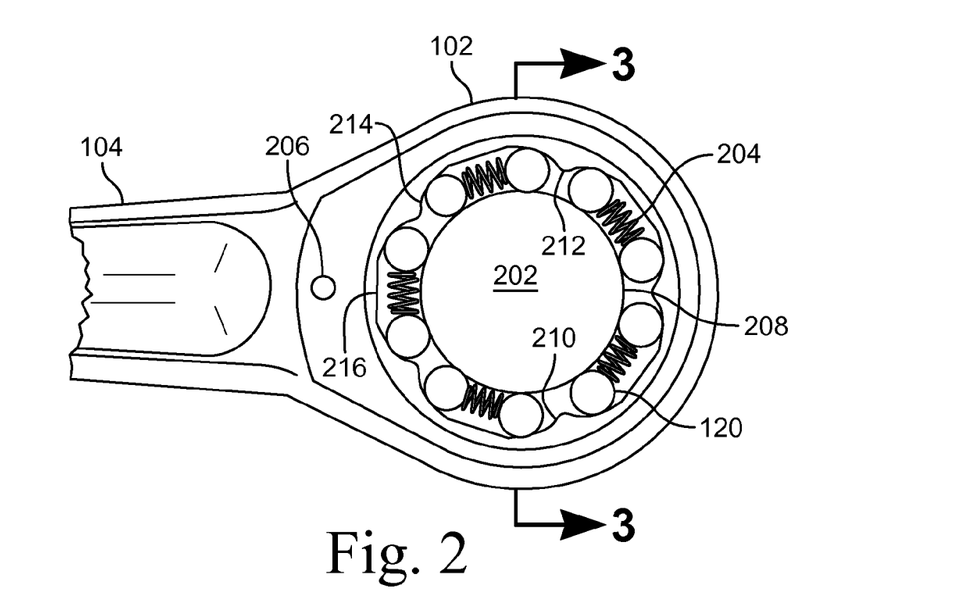
FIG. 2 is a plan view of one embodiment of the wrench with the cover and control plate removed.
Figure 3:
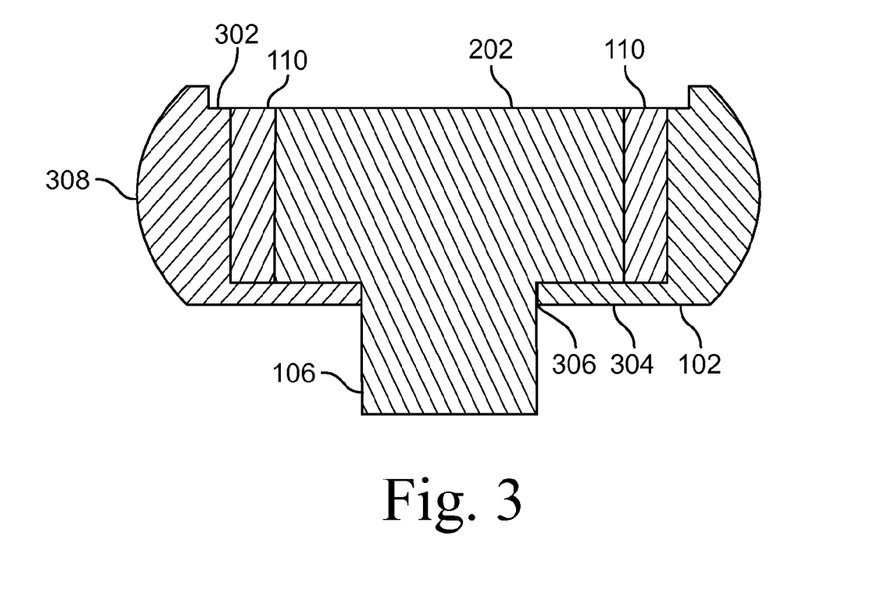
FIG. 3 is a cross-sectional view of the wrench illustrated in FIG. 2.

FIG. 2 illustrates a plan view of one embodiment of the wrench 100 with the cover 108 and control plate 112 removed, showing a portion of the anti-rotation mechanism 400. FIG. 3 illustrates a cross-sectional view of the wrench 100 illustrated in FIG. 2. In the illustrated embodiment, the head 110 is a solid piece of metal with a cavity formed inside whereby the housing 102 is defined. The head 110 has a bulging side 308, that is, the side 308 of the head 110 protrudes away from the center of the head 110 and presents a thicker cross-section in the center between the ledge 302 and the face 304. The bulging side 308 allows the head 110, and the housing 102, to maintain dimensional stability under load while minimizing the weight of the housing 102 by not having excess material near the ledge 302 and the face 304. Additional strength is given by the connection of the handle 104 to the housing 102. The end of the handle 104 next to the housing 102 flares out and the half of the housing 102 nearest the handle 104 is enlarged where the end of the handle 104 merges into the housing 102. The combination of the flared handle 104 and the beefed up housing 102 ensures that the stresses induced by the handle 104 during operation of the wrench 100 are distributed to the housing 102 with minimal deformation of the outer race 210 inside the housing 102. That is, the handle 104 is attached to the housing 102 with a contoured configuration in which the torsion force from the handle 104 is transferred to at least one third of the circumference of the housing 102, thereby minimizing force induced distortion of the housing 102.

The housing 102 has an inside surface, or outer race, 210. In the illustrated embodiment, the outer race 210 has a series of protrusions 212 that extend into the area between the inner and outer races 208, 210. On each side of each protrusion 212 is a curved surface 214. Between the curved surfaces 214 is a flat surface 216. The protrusions 212 are spaced at equal intervals around the outer race 210. That is, the protrusions 212 are regularly spaced.

Inside the housing 102 is a drive 202 that has a drive end 106 protruding from an opening 306 in a face 304 of the head 110. The drive 202 is cylindrical and the outside surface forms an inner race 208. The space between the outer race 210 and the inner race 208 is a raceway.

Between the outer race 210 and the inner race 208 are a plurality of rollers 120. The rollers 120 are cylindrical and arranged in pairs with a protrusion 212 positioned between the rollers 120-A, 120-B of each pair. Between the pairs of rollers 120 are springs 204 that bias the rollers 120 toward the adjacent protrusions 212. The rollers 120 each have a longitudinal axis that is parallel to the rotational axis of the drive 202.

In the illustrated embodiment, the cover 108 is configured to fit against the ledge 302 in the housing 102. Visible at the junction between the head 110 and the handle 104 is a cavity, or hole, 206 that receives a spring 124 and ball 122 for the spring-loaded detent. The spring 124 biases the ball 122 such that the ball 122 protrudes above the level of the ledge 302 surrounding the opening in the housing 102. The spring 124 has sufficient force to cause the ball 122 to engage one of the recesses 126 in the cover 108, thereby locking or latching the cover 108 in one of multiple positions.

Although the illustrated embodiment shows 5 pairs of rollers 120, the number of pairs of rollers 120 is variable depending upon the size of the anti-rotation mechanism 400. For example, a small wrench 100, such as one with a ¼ inch drive 106, is operable with as few as 3 pairs of rollers 120. A larger wrench, such as one with a ¾ inch drive 106, will use as many pairs of rollers 120 as necessary to evenly distribute the load around the drive 202 and provide enough frictional engagement to prevent relative movement between the housing 102 and the drive 202 under load.

In various embodiments, the number of pairs of rollers 120 is an odd number. A configuration with an odd number of pairs of rollers 120, such as illustrated in the figures, avoids locking up or binding of the anti-rotation mechanism 400. With an odd number of pairs of rollers 120, no pair of rollers 120 is diametrically opposite another pair of rollers 120. Instead, with an odd number, each pair of rollers 120 is diametrically opposite the space between two opposing pairs of rollers 120, and the three pairs of rollers 120 act similarly to a tripod with respect to being stable.

Also, the odd number of pairs of rollers 120 has a self-centering effect on the drive 202 within the housing 102.

Figure 4:
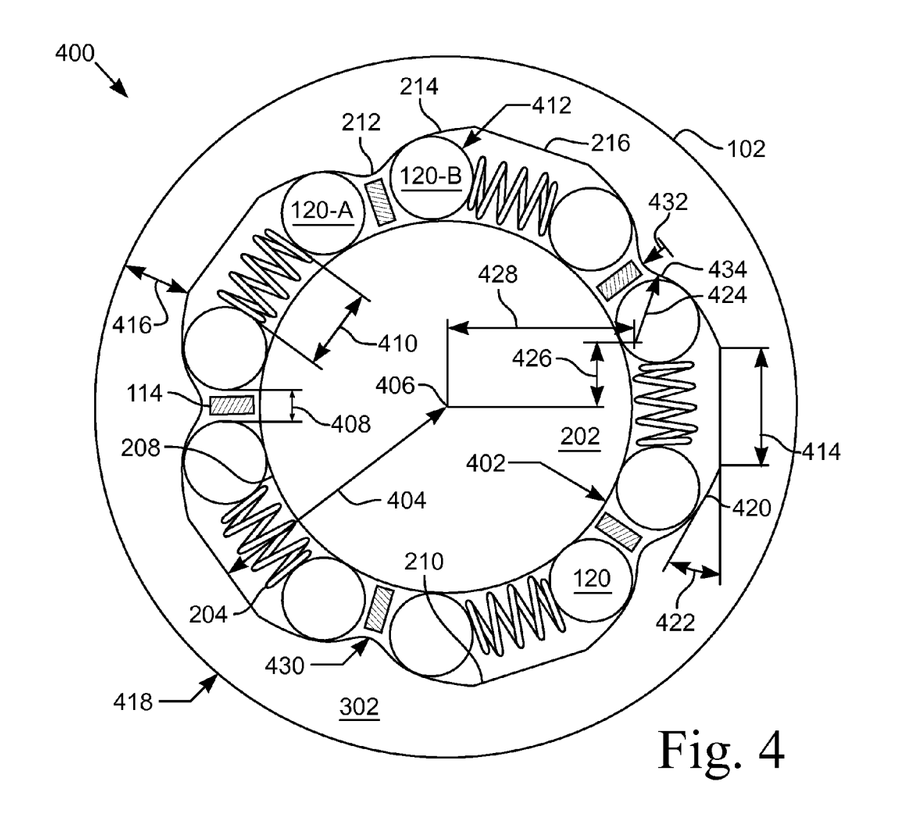
FIG. 4 is a plan view of one embodiment of an anti-rotation mechanism showing the configuration and relationship of the rollers to the inner and outer races.

FIG. 4 illustrates a plan view of one embodiment of the anti-rotation mechanism 400 showing the configuration and relationship of the rollers 120 to the inner race 208 and outer race 210. Between the rollers 120-A, 120-B of a pair of rollers 120-A, 120-B is a prong 114. The prongs 114 are illustrated in a center position where the prongs 114 do not contact the rollers 120. Each spring 204 biases two rollers 120 and forces the rollers 120 to contact the inner race 208 and the outer race 210 adjacent the protrusion 212.

In one embodiment, the anti-rotation mechanism 400 is incorporated into a wrench 100, such as a socket wrench with a ½ inch square drive end 106. In one such embodiment, anti-rotation mechanism 400 has dimensions as follows, which are given as an example of one embodiment. The dimensions vary depending upon the size of the anti-rotation mechanism 400 and the amount of rotation force expected to be inhibited. The diameter 402 of the driver 202 inside the housing 102, which defines the inner race 208, is 1.012 inches. The outer race 210 includes a flat surface 216 that has a distance 404 from the center 406 of the driver 202 of 0.73 inches.

Between the inner and outer races 208, 210 are pairs of rollers 120-A, 120-B. Between the rollers 120-A, 120-B is a prong 114, which is shown in the center position where the prong 114 does not contact either of the rollers 120. The rollers 120 in each pair of rollers 120-A, 120-B is separated by a gap 408 of 0.10759 inches. Each pair of rollers 120-A, 120-B is separated by a spring 204 with a gap 410 of 0.21305 inches. Each roller 120 has a diameter 412 of 0.220 inches.

The outer race 210 has a convoluted surface that includes a series of flat surfaces 216 that are between curved surfaces 214, and the curved surfaces 214 are joined at protrusions 212. Each flat surface 216 has a length 414 of 0.3250 inches. Where the flat surface 216 meets the curved surface 214, the distance 416 from the outer edge of the anti-rotation mechanism 400 is 0.18963 inches. This outer edge corresponds to the wall of the ledge 302 illustrated in FIG. 3. The outer edge has a diameter 418 of 1.8750 inches.

The curved surface 214 has an angular portion 420 that has an angle 422 of 28 degrees relative to the flat surface 216. The curved surface 214 has a curve 434 that is defined by a radius 424 of 0.20 inches that has a center that is offset from the driver center 406 by a first dimension 426 of 0.17427 inches and a second, orthogonal dimension 428 of 0.49723 inches. The center of the curve 434 defined by the radius 424 is in the raceway bounded by the outer race 210 and the inner race 208. The center of the radius 424 is proximate its associated protrusion 212 such that the radius 424 is substantially less than the distance 404 from the center 406 of the driver 202 to the outermost portion of the outer race 210.

The protrusion 212 has a peak with a radius 430 of 0.050 inches. The portion of the protrusion 212 that is closest to the inner race 208 is a distance 432 of 0.07418 from the radius of the circle that bounds the outer race 210. In the illustrated embodiment, the protrusion 212 joins the curved surface 214 at a point that is tangent to both surfaces 212, 214. The curved portion 434 of the curved surface 214 mates with the angular portion 420 at a point that is tangent to the radius 424 of the curved portion.

Figure 5:
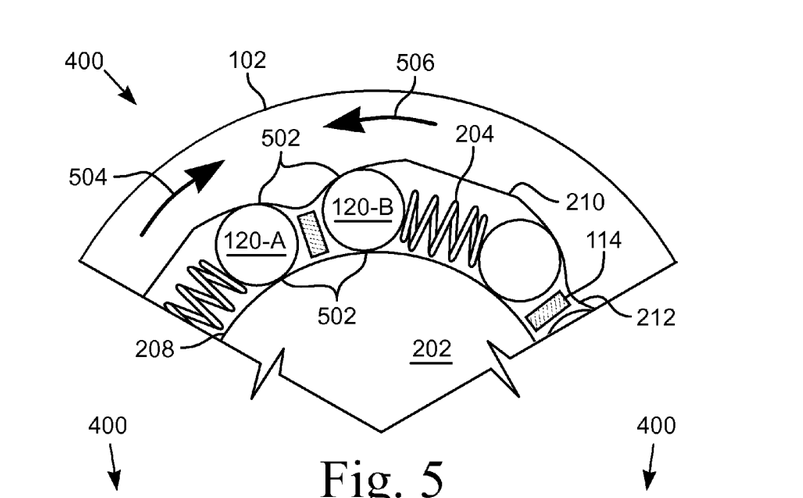
FIG. 5 is a partial plan view of one embodiment of the anti-rotation mechanism with the drive locked relative to the wrench housing.

FIG. 5 illustrates a partial plan view of one embodiment of the anti-rotation mechanism 400 with the drive locked relative to the wrench housing 102. The control plate 112 with its projecting prongs 114 is in the center position. That is, the control plate 112 is positioned such that each prong 114 is between the rollers 120-A, 120-B of a pair of rollers 120-A, 120-B. The prongs 114 are not touching either roller 120-A, 120-B and are sufficiently separated from the rollers 120-A, 120-B that the rollers 120-A, 120-B do not contact the prongs 114 during normal operation. In the illustrated center position, the drive 202 is held stationary relative to the housing 102. That is, there is no relative motion between the drive 202 and the housing 102 and the drive 202 will move with the housing 102 when the handle 104, for the wrench embodiment, is moved in either rotary direction, such as for loosening or tightening a fastener.

When a counter-clockwise force 506 is applied to the housing 102, the first roller 120-A contacts both the inner race 208 and the outer race 210 at a line of contact 502 on each race 208, 210. The line of contact 502 extends the length of the first roller 120-A where the first roller 120-A is in physical contact with each race 208, 210.

The spring 204 biases the rollers 120-A, 120-B against the curved surface 214 of the outer race 210 and the inner race 208. The counter-clockwise force 506 on the housing 102 forces the first roller 120-A to frictionally engage the inner race 208 and the outer race 210. Because the rollers 120 are evenly distributed around the races 208, 210, the frictional engagement securely fixes the drive 202 in the housing 102 and prevents relative movement between the drive 202 and the housing 102.

Each protrusion 212 is dimensioned and configured to prevent the corresponding roller 120-A from slipping as the roller 120-A is pinched between the inner race 208 and the outer race 210. The protrusion 212 extends a sufficient distance toward the inner race 208 that it defines a gap that is narrower than the diameter of the roller 120. The gap between the protrusion 212 and the inner race 208 is always less than the diameter of the roller 120, even when the mechanism 400 is under maximum load. The bulge 308 on the outside of the housing 102 provides structural strength to minimize expansion of the housing 102 by the forces from the roller 120-A being pinched between the inner race 208 and the outer race 210. But, if the housing 102 were to expand such that the outer race 210 were to move away from the inner race 208, the protrusion 212 ensures that a surface of the outer race 210 remains in contact 502 with the roller 120-A.

When a clockwise force 504 is applied to the housing 102, the second roller 120-B acts in a similar manner as the first roller with a counter-clockwise force 506 applied. That is, the second roller 120-B has a line of contact 502 on each race 208, 210 as the second roller 120-B frictionally engages the races 208, 210. Accordingly, regardless of the direction of the force 504, 506 applied to the housing 102, the drive 202 will not move relative to the housing 102.

Although a force 504, 506 applied to the housing 102 is discussed, the discussion herein is equally applicable if a force in the opposite direction is applied to the drive 202.

In various embodiments, the rollers 120, inner race 208, and/or outer race 210 are hardened steel. For example, the rollers 120 are solid heat treated to minimize fracturing of the rollers 120.

Figure 6:
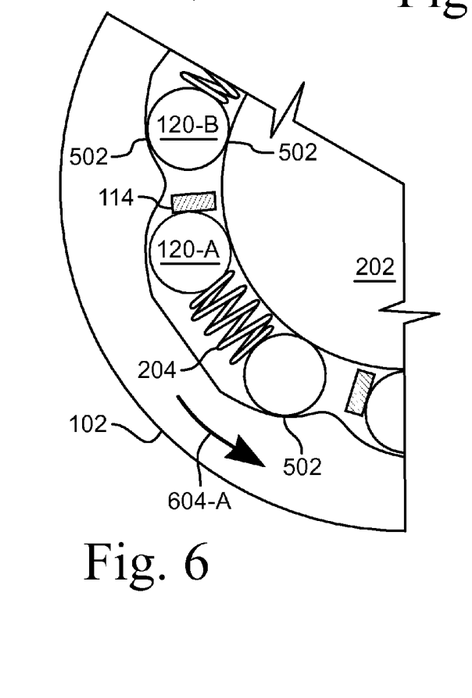
FIG. 6 is a partial plan view of one embodiment of the anti-rotation mechanism with the drive restricted in one direction relative to the wrench housing.

FIG. 6 illustrates a partial plan view of one embodiment of the anti-rotation mechanism 400 with the drive restricted in one direction relative to the wrench housing 102. The control plate 112 with its projecting prongs 114 is in a first position away from the center position. The control plate 112 is positioned such that each prong 114 contacts a first roller 120-A and has moved the first roller 120-A away from the adjacent protrusion 212.

With the first roller 120-A positioned away from the protrusion 212, a counter-clockwise force 506 applied to the housing 102 results in relative movement between the drive 202 and the housing 102. A counter-clockwise force 506 applied to the housing 102 causes the first roller 120-A to rotate when either the inner or outer race 208, 210 contacts the roller 120-A. The counter-clockwise force 506 also causes the second roller 120-B to likewise rotate when either the inner or outer race 208, 210 contacts the roller 120-A. Neither roller 120-A, 120-B has two lines of contact 502 when a counter-clockwise force 506 is applied. Because no roller 120-A, 120-B has two lines of contact 502, the housing 102 is free to rotate in a counter-clockwise direction 604-A relative to the drive 202 when the control plate 112 is in the first position away from the center position.

When a clockwise force 504 is applied to the housing 102, the second roller 120-B contacts both the inner race 208 and the outer race 210 at a line of contact 502 on each race 208, 210. The lines of contact 502 extend the length of the second roller 120-B where the second roller 120-B is in physical contact with each race 208, 210. The spring 204 biases the second roller 120-B such that it has two lines of contact 502 with the inner and outer races 208, 210. With the control plate 112 in the first position away from the center position and a clockwise force 504 applied, the anti-rotation mechanism 400 operates in a similar manner as with the control plate 112 in the center position, and there is no relative motion between the housing 102 and the drive 202.

Accordingly, with the control plate 112 in a first position away from the center position, for the embodiment where the anti-rotation mechanism 400 is incorporated in a wrench 100, the wrench 100 is configured to tighten a fastener with a right-hand thread when the wrench handle 104 is reciprocated.

Figure 7:
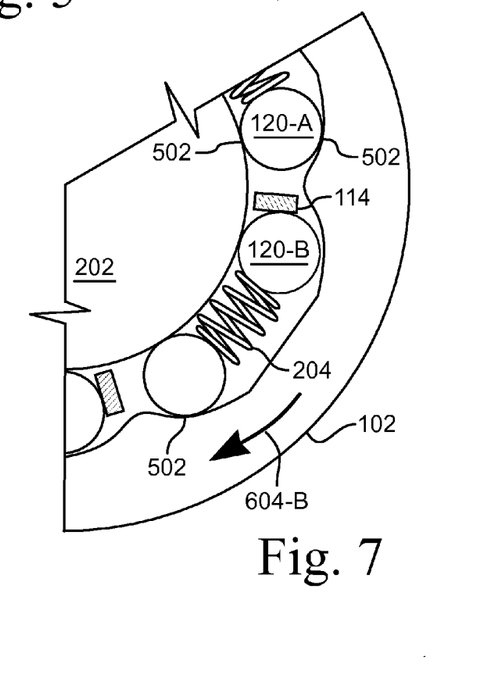
FIG. 7 is a partial plan view of one embodiment of the anti-rotation mechanism with the drive restricted in another direction relative to the wrench housing.

FIG. 7 illustrates a partial plan view of one embodiment of the anti-rotation mechanism 400 with the drive restricted in another direction relative to the wrench housing 102. The control plate 112 with its projecting prongs 114 is in a second position away from the center position. The control plate 112 is positioned such that each prong 114 contacts a second roller 120-B and has moved the second roller 120-B away from the adjacent protrusion 212.

With the second roller 120-B positioned away from the protrusion 212, a clockwise force 504 applied to the housing 102 results in relative movement between the drive 202 and the housing 102. A clockwise force 504 applied to the housing 102 causes the second roller 120-B to rotate when either the inner or outer race 208, 210 contacts the roller 120-A. The clockwise force 504 also causes the first roller 120-A to likewise rotate when either the inner or outer race 208, 210 contacts the roller 120-A. Neither roller 120-A, 120-B will have two lines of contact 502 when a clockwise force 504 is applied. Because no roller 120-A, 120-B has two lines of contact 502, the housing 102 is free to rotate in a clockwise direction 604-B relative to the drive 202 when the control plate 112 is in the second position away from the center position.

When a counter-clockwise force 506 is applied to the housing 102, the first roller 120-A contacts both the inner race 208 and the outer race 210 at a line of contact 502 on each race 208, 210. The lines of contact 502 extend the length of the first roller 120-A where the first roller 120-A is in physical contact with each race 208, 210. The spring 204 biases the first roller 120-A such that it has two lines of contact 502 with the inner and outer races 208, 210. With the control plate 112 in the second position away from the center position and a counter-clockwise force 506 applied, the anti-rotation mechanism 400 operates in a similar manner as with the control plate 112 in the center position, and there is no relative motion between the housing 102 and the drive 202.

Accordingly, with the control plate 112 in a second position away from the center position, for the embodiment where the anti-rotation mechanism 400 is incorporated in a wrench 100, the wrench 100 is configured to loosen a fastener with a right-hand thread when the wrench handle 104 is reciprocated.

Figure 8:
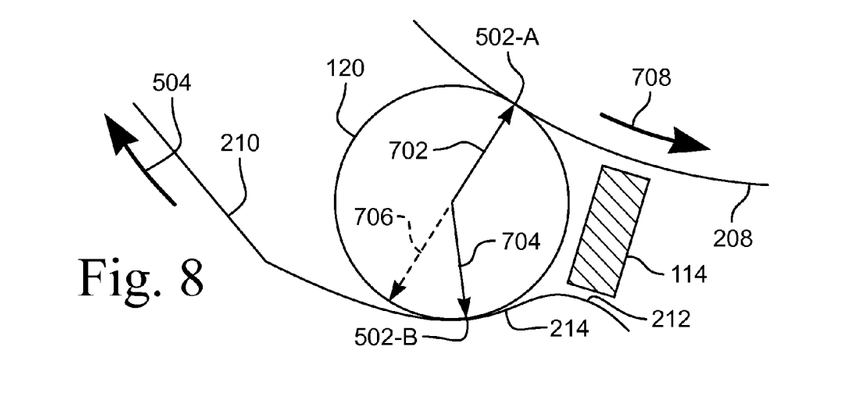
FIG. 8 is an illustration of the force vectors when a roller prevents rotation.

FIG. 8 illustrates the force vectors 702, 704 when a roller 120 prevents rotation of the inner race 208 relative to the outer race 210. In FIG. 8, the prong 114 is shown in either the center position or a position where the prong 114 contacts the adjacent roller 120 (not shown in FIG. 8). Because the prong 114 is not contacting the roller 120, the roller 120 is not constrained by the prong 114.

When a clockwise force 504 is applied to the housing 102, an opposite force 708 in the drive 202 opposes the clockwise force 504. These forces 504, 708 act upon the roller 120. The roller 120, if it were not restrained by the narrowing gap between the inner and outer races 208, 210, would rotate clockwise. The roller 120 is biased toward the protrusion 212 by the spring 204 and is not able to rotate because there is a line of contact 502-A between the roller 120 and the inner race 208 and a line of contact 502-B between the roller 120 and the outer race 210 and the roller 120 cannot fit into the gap between the races 208, 210 because the outer race 210 moves closer to the inner race 210 between the line of contact 502-B and the protrusion 212. Because of the spring-bias pushing the roller 120 against the curved surface 214 of the protrusion 212, little, if any, relative movement between the inner and outer races 208, 210 is necessary for the roller 120 to frictionally engage the races 208, 210.

Internal to the roller 120, lines of force 702, 704 extend from the center of the roller 120 to the lines of contact 502-A, 502-B. One line of force 702 extends from the center of the roller 120 to the line of contact 502-A with the inner race 208. The line of force 702 is normal to a line tangent to the roller 120 at the line of contact 502-A. Another line of force 704 extends from the center of the roller 120 to the line of contact 502-B with the outer race 210. The line of force 704 is normal to a line tangent to the roller 120 at the line of contact 502-B. As the clockwise force 504 increases, the forces 702, 704 at the lines of contact 502-A, 502-B increase, which increases the frictional engagement of the roller 120 to the inner and outer races 208, 210.

One line of force 702 is in line with the center of the roller 120 and the center for the drive 202. By extending that line of force 702 in the opposite direction 706, it is apparent that there is no direct force applied radially to the outer race 210 and the housing 102 such that the housing 102 does not have a direct radial force causing the housing 102 to expand, thereby widening the gap between the inner and outer races 208, 210 and allowing passage of the roller 120 under extreme loads. It is noted that the vector force 704 has a component in the radial direction, but, because of the curved surface 214 and protrusion 212, that component is reduced. The line of contact 502-B is located a substantial distance from the line 702, 706 that passes through the center of the roller 120 and the center for the drive 202. Substantial, as used here, means that the line of contact 502-B is positioned near the medial portion of the quadrant of the roller 120 with one side of the quadrant defined by the line that passes through the center of the roller 120 and the center for the drive 202. In one embodiment, the medial portion is located approximately 45 degrees radially from the line 702, 706 that passes through the center of the roller 120 and the center for the drive 202. For example, the line of force 704 has an angle between 30 and 60 degrees from the portion of the line 702, 706 that passes through the center of the roller 120 and the center for the drive 202 and is outboard of the center of the roller 120 relative to the center of the drive 202. The line of force 704 is directed such that the outer race 210 and the housing 102 are substantially dimensionally stable and not subject to deformation that could result in the binding rollers 120 rolling over the protrusions 212. That is, the rollers 120 applying the lines of force 706 are held stationary relative to the corresponding protrusion 212.

The anti-rotation mechanism 400 includes various functions. The function of inhibiting deformation of the housing 102 under load is implemented, in one embodiment, by the curved surface 214 of the protrusion 212 that positions the vector of force 704 away from a radial direction 706 that would cause the outer race 210 and housing 102 to deform.

In another embodiment the function of inhibiting deformation of the housing 102 under load is implemented by the bulging side 308 of the housing 102. In another such embodiment, the function of inhibiting deformation of the housing 102 under load is implemented by the contoured connection of the handle 102 to the housing 102, which distributes the torsion forces from the handle 102 to a substantial portion of the housing 102.

The function of preventing relative motion between the drive 202 and the housing 102 is implemented, in one embodiment, by the protrusions 212 that narrow the gap between the inner and outer races 208, 210.

The function of allowing rotation in only one direction 604-A, 604-B is implemented, in one embodiment, by the rollers 120 downstream of the protrusion 212, considering the movement of the race with the protrusion 212, being positioned away from the protrusion 212 such that the rollers 120 do not simultaneously contact both the inner and outer races 208, 210.

The function of positioning the roller 120 to allow rotation in only one direction 604-A, 604-B is implemented, in one embodiment, by the prongs 114 that are located adjacent the protrusion 212 and contact the rollers 120 downstream of the protrusion 212, considering the movement of the race with the protrusion 212. In one such embodiment, the prongs 114 are attached to a control plate 112 that is movable between multiple positions.

The function of locking the control plate 112 in one of multiple positions is implemented, in one embodiment, by a spring-loaded detent as illustrated in FIGS. 1 and 2. In various embodiments, the detent ball 122 engages two or three recesses 126 that allow the control plate 112 to be releasably secured in a position.

The function of biasing a roller 120 against a corresponding protrusion 212 is implemented, in one embodiment, by a spring 204. In one such embodiment, the spring 204 is a coil spring that bears against adjacent rollers 120 between adjacent protrusions 212. In another embodiment, the spring 204 is a ribbon spring formed to bias a portion of the length of each roller 120. In various such embodiments the spring 204 has an M-shape or other configuration that applies a bias evenly along a portion of the length of the roller 120.

From the foregoing description, it will be recognized by those skilled in the art that an anti-rotation mechanism 400 has been provided. The anti-rotation mechanism 400, by virtue of the rollers 120 and frictional engagement, is a silent device in operation when compared to a ratchet-type device that relies upon a pawl engaging a tooth. The anti-rotation mechanism 400 offers an almost infinite number of angular reciprocations, unlike a ratchet-device in which the reciprocations are defined by the separation of the teeth.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An anti-rotation mechanism incorporated in a wrench, said mechanism comprising:
   a first race having a cylindrical surface and an axis of rotation;
   a second race having a plurality of protrusions, said plurality of protrusions spaced regularly around said second race, said first race inside said second race, said axis of rotation of said first race coaxial with a center axis of said second race;
   a plurality of pairs of rollers, each one of said plurality of pairs of rollers having a first roller and a second roller, a corresponding one of said plurality of protrusions positioned between said first roller and said second roller;
   a plurality of springs, each one of said plurality of springs between adjacent pairs of said plurality of pairs of rollers, said plurality of springs biasing said plurality of first and second rollers toward said corresponding one of said plurality of protrusions; and
   a plurality of positioning members, each one of said plurality of positioning members adjacent a peak of a corresponding one of said protrusions, said plurality of positioning members movable in tandem to a first position in which each of said first rollers is positioned away from said corresponding protrusion wherein said second rollers inhibit motion of said first race relative to said second race in a first direction, said plurality of positioning members movable to a second position in which each of said second rollers is positioned away from said corresponding protrusion wherein said first rollers inhibit motion of said first race relative to said second race in a second direction that is opposite to said first direction, and wherein each one of said plurality of protrusions is defined by a first surface and a second surface joined at said peak, said first roller engaging said first surface and said second roller engaging said second surface, said peak being a rounded surface, each one of said first and second surfaces being concave and defined by a first radius, said first radius having a center proximate a corresponding one of said protrusions and within a space defined between said first race and said second race.

2. The mechanism of claim 1 wherein each one of said first rollers and each one of said second rollers has a line of contact with said corresponding one of said plurality of protrusions, each one of said lines of contact being located medially in a roller quadrant with one boundary of said roller quadrant defined by a line including a center of said first race and a center of a corresponding one of said first or second rollers.

3. The mechanism of claim 1 wherein when movement of said first race relative to said second race is inhibited a force is applied by one of said first or second rollers to said corresponding one of said plurality of protrusions, said force having a direction that is directed away from an outward radial direction such that said second race is dimensionally stable whereby said one of said first or second rollers is held stationary relative to said corresponding one of said plurality of protrusions.

4. The mechanism of claim 1 further including a control member attached to said plurality of positioning members, said control member rotating about said axis of rotation of said first race, said control member releasably secured with said plurality of positioning members in one of said first position and said second position, and said control member moving said plurality of positioning members within a circular path between said first position and said second position.

5. The mechanism of claim 1 wherein said second race is an inside surface of a housing, said housing having an outside surface with a bulge configured to reduce expansion of said second race when a force is applied to said first race when motion between said first and second races is inhibited, and further including a handle attached to said housing with a contoured configuration in which a torsion force from said handle is transferred to at least one third of the circumference of said housing.

6. The mechanism of claim 1 wherein a number of said plurality of pairs of rollers is an odd number.

7. An apparatus for a wrench with an anti-rotation mechanism, said apparatus comprising:
- a housing having an inside surface defining an outer race, said inside surface having a plurality of protrusions, said plurality of protrusions being regularly spaced about the circumference of said outer race, each of said plurality of protrusions defined by a first concave arcuate surface and a second concave arcuate surface;
- a member having a cylindrical outer surface defining an inner race, said member dimensioned to fit within said outer race;
- a plurality of pairs of rollers, each one of said plurality of pairs of rollers having a first roller and a second roller, each one of said plurality of protrusions positioned between said first and second rollers of a corresponding one of said plurality of pairs of rollers, each one of said first concave arcuate surfaces and said second concave arcuate surfaces are defined by a radius, said radius having a center proximate a corresponding one of said protrusions and within a space defined between said inner race and said outer race, and said radius having a length greater than a radius of one of said first rollers;
- a plurality of springs equal in number to said plurality of pairs of rollers, each one of said plurality of springs biasing a first roller of one of said plurality of pairs of rollers away from a second roller of an adjacent one of said plurality of pairs of rollers; and
- a plurality of positioning members, each one of said plurality of positioning members positioned between said first and second rollers of said corresponding one of said plurality of pairs of rollers, each one of said plurality of positioning members having a length sufficient to displace said first roller away from said corresponding one of said plurality of protrusions when said plurality of positioning members are in a first position and to displace said second roller away from a corresponding one of said plurality of protrusions when said plurality of positioning members are in a second position,
- with said plurality of positioning members in said first position each one of said second rollers biased against a corresponding one of said second concave arcuate surfaces whereby each one of said second rollers binds between said inner race and said outer race and inhibits relative motion between said inner and outer races in a first direction, and
- with said plurality of positioning members in said second position each one of said first rollers biased against a corresponding one of said first concave arcuate surfaces whereby each one of said first rollers binds between said inner race and said outer race and inhibits relative motion between said inner and outer races in a second direction.

8. The apparatus of claim 7 wherein each one of said first rollers and each one of said second rollers has a line of contact with said corresponding one of said protrusions, each one of said lines of contact being located medially in a roller quadrant with one boundary of said roller quadrant defined by a line including a center of said inner race and a center of a corresponding one of said first or second rollers.

9. The apparatus of claim 7 wherein when movement of said inner race relative to said outer race is inhibited a force is applied by one of said first or second rollers to said corresponding one of said plurality of protrusions, said force having a direction that is directed away from an outward radial direction such that said outer race is dimensionally stable whereby said one of said first or second rollers is held stationary relative to said corresponding one of said plurality of protrusions.

10. The apparatus of claim 7 further including a control member attached to said plurality of positioning members, said control member releasably secured with said plurality of positioning members in one of said first position and said second position, and said control member moving said plurality of positioning members within a circular path between said first position and said second position.

11. The apparatus of claim 7 wherein said inner race is part of a driver and said housing is attached to a handle, and said housing has an outside surface with a bulge configured to reduce expansion of said outer race from a force applied to said outer race when motion between said inner and outer races is inhibited.

12. The apparatus of claim 7 wherein a number of said plurality of pairs of rollers is an odd number.

13. An apparatus for a wrench with an anti-rotation mechanism, said apparatus comprising:
- a housing with a cavity, said cavity having an inside surface defining an outer race, said outer race having at least three protrusions regularly spaced around said outer race, each one of said protrusions defined by a first surface and a second surface joined at a peak, said first and second surfaces being concave and defined by a first radius;
- a member having a cylindrical outer surface dimensioned to fit inside said cavity, said cylindrical outer surface defining an inner race, said first radius having a center proximate a corresponding one of said protrusions, said inner race and said outer race defining a raceway, said center of said first radius is within said raceway, and said first radius has a length less than a radius of said member;
- at least three first rollers, each one of said first rollers proximate said first surface of a corresponding one of said protrusions;
- at least three second rollers, each one of said second rollers proximate said second surface of a corresponding one of said protrusions;
- at least three springs, each one of said springs biasing a corresponding one of said first rollers toward said first surface of said corresponding one of said protrusions, each one of said springs biasing a corresponding one of said second rollers toward said second surface of said corresponding one of said protrusions; and
- at least three prongs operatively moving in tandem, each one of said prongs proximate a corresponding one of said protrusions, each one of said prongs selectively engaging said first and second rollers to move one of said first and second rollers away from said corresponding one of said protrusions.

14. The apparatus of claim 13 further including a control member attached to said at least three prongs, said control member releasably secured with said at least three prongs in one of a first position and a second position, and said control member moving said at least three prongs within a circular path between said first position and said second position.

15. The apparatus of claim 13 wherein said housing has an outside surface with a bulge configured to reduce expansion of said outer race from a force applied to said outer race when motion between said inner and outer races is inhibited.

16. The apparatus of claim 13 wherein said inner race is part of a driver, and further including a handle attached to said housing with a contoured configuration in which a torsion force from said handle is transferred to at least one third of the circumference of said housing.

17. The apparatus of claim 13 wherein each one of said first rollers and each one of said second rollers has a line of contact with a corresponding one of said protrusions, and said line of contact being substantially distant from a plane defined by an axis of rotation of said inner race and a longitudinal axis of a corresponding one of said first or second rollers.

* * * * *